(12) United States Patent
Sato et al.

(10) Patent No.: US 6,476,525 B2
(45) Date of Patent: Nov. 5, 2002

(54) LINEAR ACTUATOR

(75) Inventors: Toshio Sato, Tsukuba; Shogo Miyazaki; Yoshiteru Ueno, both of Ibaraki-ken, all of (JP)

(73) Assignee: SMC Kabushiki Kaisha, Tokyo (JP)

( * ) Notice: Subject to any disclaimer, the term of this patent is extended or adjusted under 35 U.S.C. 154(b) by 56 days.

(21) Appl. No.: 09/785,974

(22) Filed: Feb. 17, 2001

(65) Prior Publication Data

US 2001/0015581 A1 Aug. 23, 2001

(30) Foreign Application Priority Data

Feb. 18, 2000 (JP) .................................... 2000-042045

(51) Int. Cl.[7] ............................................... H02K 7/06
(52) U.S. Cl. ...................................................... 310/20
(58) Field of Search ............................. 310/12, 13, 14, 310/20, 80

(56) References Cited

U.S. PATENT DOCUMENTS 5,941,130 A * 8/1999 Olgren et al. ................. 74/493
6,000,491 A * 12/1999 Shimizu et al. .............. 180/444

FOREIGN PATENT DOCUMENTS

| JP | 6-49963 | 12/1994 |
| JP | 7-61587 | 7/1995 |
| JP | 7-248006 | 9/1995 |
| JP | 10-318209 | 12/1998 |

OTHER PUBLICATIONS

Copy of co-pending U.S. patent application Ser. No. 09/784,182 by Toshio Sato et al., filed Feb. 16, 2001.

* cited by examiner

Primary Examiner—Nestor Ramirez
Assistant Examiner—Judson H. Jones
(74) Attorney, Agent, or Firm—Paul A. Guss

(57) ABSTRACT

A linear actuator comprises a mobile which is provided substantially perpendicularly to a longitudinal axis of a ball screw shaft with its first side portion connected to a screw guide member and with its second side portion slidably fitted to a slider, while movably holding a ball screw nut engaged with the ball screw shaft by the aid of the screw guide member which is finely movable in a recess of the slider allowed to ride over a guide rail in a bridging manner.

7 Claims, 8 Drawing Sheets

LINEAR ACTUATOR

BACKGROUND OF THE INVENTION

1. Field of the Invention

The present invention relates to a linear actuator which makes it possible to linearly and reciprocatively move, along a guide rail, a slider assembled integrally with a ball screw shaft.

2. Description of the Related Art

A linear actuator, which is based on the use of such a ball screw shaft, has been hitherto known. For example, both outer surfaces of a slider are movably supported in a major axis direction of both inner surfaces of a guide rail having a substantially U-shaped cross section by the aid of ball rolling members. A ball screw shaft, which is attached to the slider and which is meshed with a ball screw hole, is rotated, and thus the slider is allowed to make reciprocating movement (see Japanese Patent Publication No. 7-61587).

However, in the case of the conventional linear actuator, if the width of the slider is widened while maintaining a constant spacing distance between the both outer surfaces of the slider and the both inner surfaces of the guide rail, the following problem arises. That is, the width of the guide rail is enlarged as a matter of course. As a result, the linear actuator has a large size, and the weight is increased.

SUMMARY OF THE INVENTION

A general object of the present invention is to provide a linear actuator which makes it possible to decrease the volume of a guide rail and reduce the weight by providing ball rolling members between both inner surfaces of a slider and both outer surfaces of a guide rail so that the widthwise dimension of the guide rail is set to be small.

A principal object of the present invention is to provide a linear actuator which makes it possible to absorb any discrepancy of parallelism between the axis of a ball screw shaft and the axis of a ball rolling groove by providing and holding a ball screw nut floatably with respect to a slider to enable the ball screw nut to follow the operation form of the ball screw shaft.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
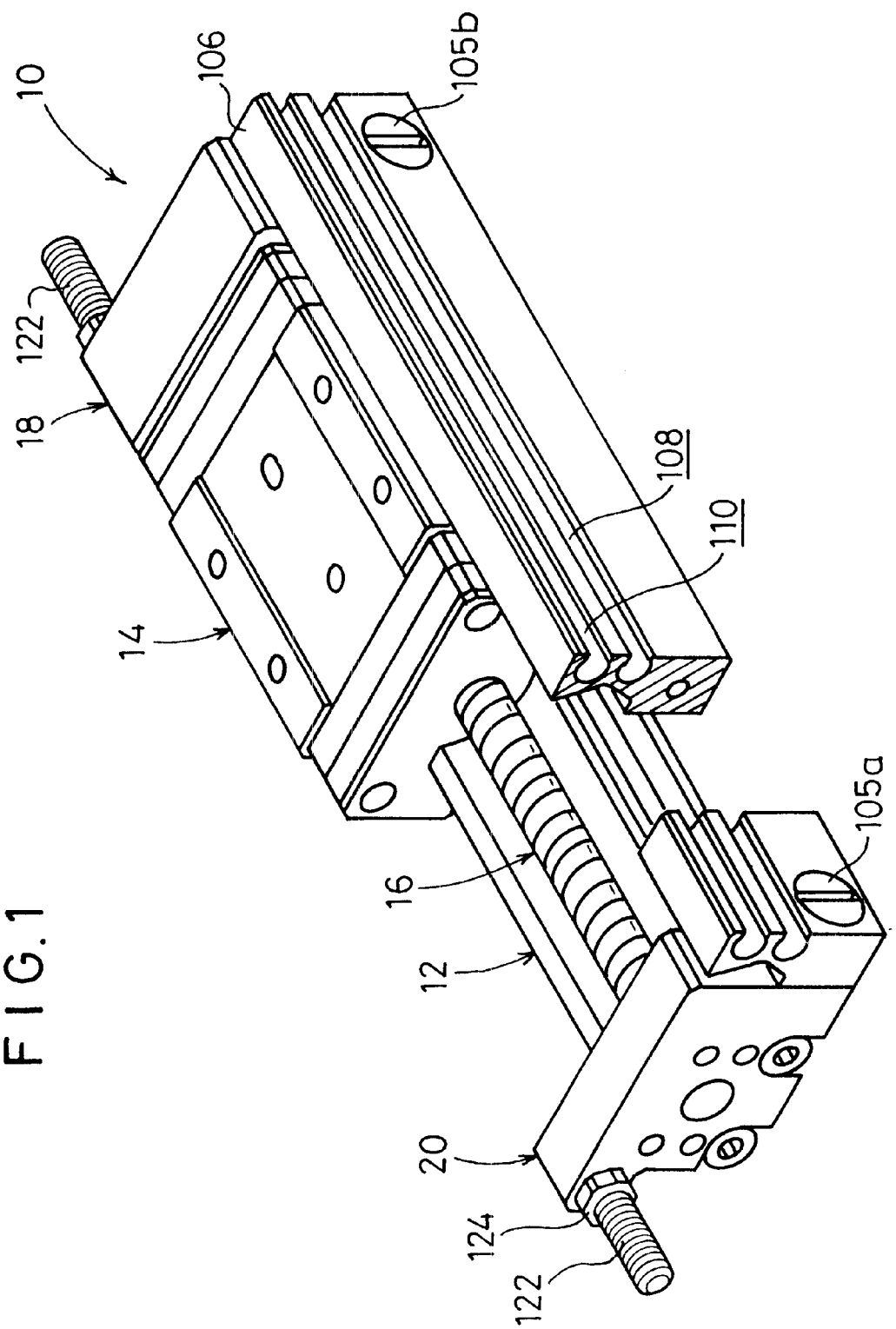
FIG. 1 shows, with partial cutout, a perspective view illustrating a schematic arrangement of a linear actuator according to a first embodiment of the present invention.

As shown in FIG. 1, a linear actuator 10 according to a first embodiment of the present invention basically comprises a guide rail 12, a slider 14 which is movably supported by the guide rail 12, a ball screw shaft 16 which is meshed with the slider 14, a pair of first bearing 18 and second bearing 20 which rotatably support the ball screw shaft 16, and a switch rail 106 which extends substantially in parallel to the axis of the ball screw shaft 16 and which is fixed to the first bearing 18 and the second bearing 20 by a pair of bolts 105a, 105b respectively.

Figure 4:
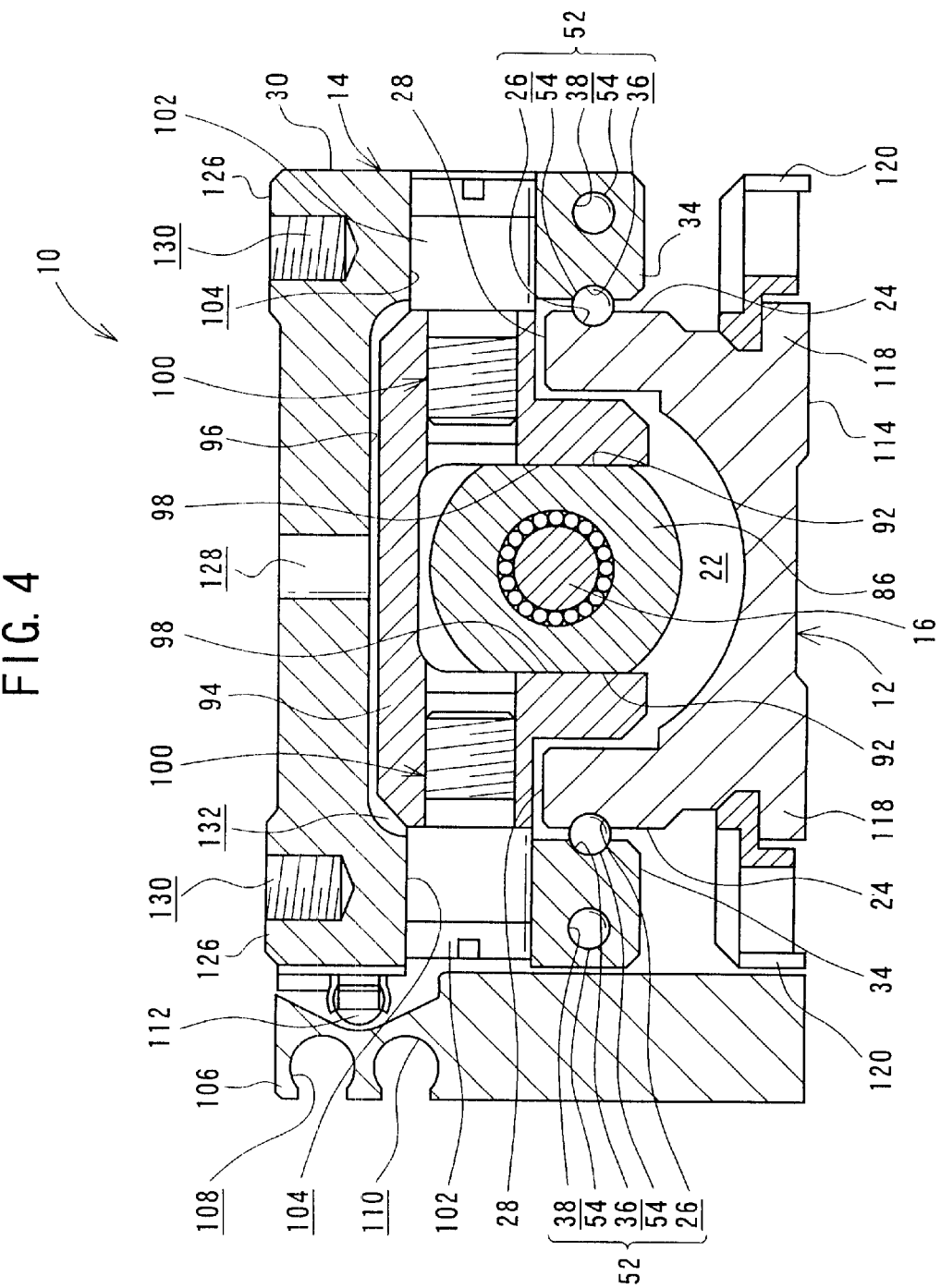
FIG. 4 shows a vertical sectional view taken along a line IV—IV shown in FIG. 3.

As shown in FIG. 4, the guide rail 12 comprises a concave groove 22 having a substantially U-shaped cross section, and members of a pair of upper surfaces 28, 28 extending linearly with the concave groove 22 intervening therebetween. The upper surfaces 28, 28 are internally provided in a recess 132 of the slider 14 as described later on so that the widthwise dimension of the guide rail 12 is smaller than the width of the slider 14. Both outer surfaces 24, 24, which rise from a bottom surface 114 of the guide rail 12, have parallel ball-rolling grooves 26 which are disposed at positions of equal spacing distances from the axial center of the ball screw shaft 16 and which extend in the major axis direction respectively.

Figure 5:
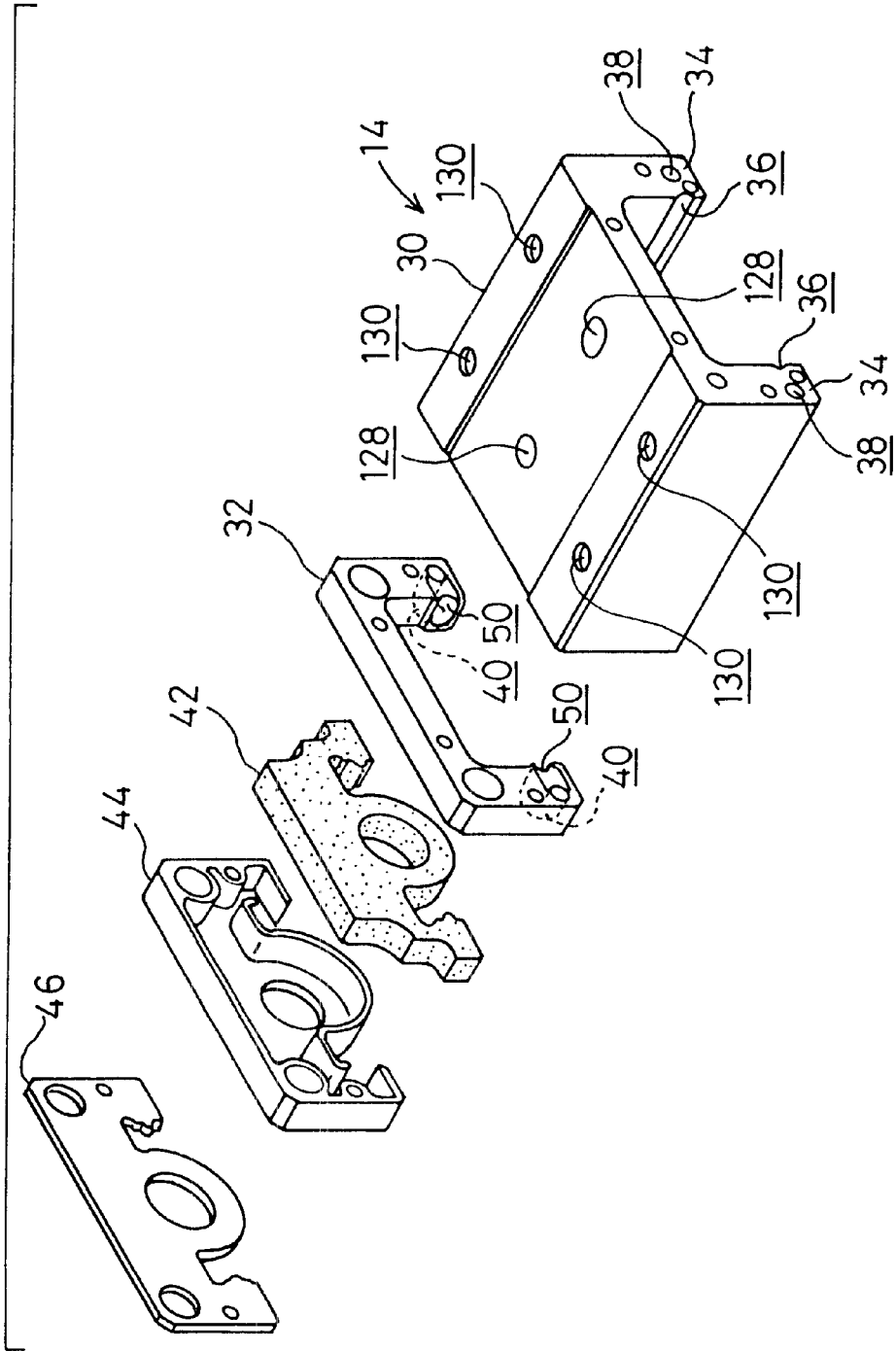
FIG. 5 shows an exploded perspective view for illustrating the relationship between a main slider body and an end plate shown in FIG. 3.

The slider 14, which is allowed to ride over the upper surfaces 28, 28 of the guide rail 12 in a bridging manner, comprises a main slider body 30, end plates 32 which are attached to both side surfaces of the main slider body 30 in the displacement direction, cover members 44 which accommodate lubricating members 42 attached to the end plates 32, and scrapers 46 (see FIG. 5). The end plates 32, the cover members 44, and the scrapers 46 are attached by bolts 48 (see FIG. 2).

As shown in FIG. 5, the main slider body 30 has thick-walled sleeve sections 34, 34 which extend downwardly at both right and left side edges thereof. Ball-rolling grooves 36, which are opposed to the ball-rolling grooves 26 of the guide rail 12, are formed on inner surfaces of the sleeve sections 34, 34. Ball passages 38, which are composed of linear through-holes parallel to the ball-rolling grooves 26, 36, are bored through the sleeve sections 34, 34. The ball-rolling grooves 26, 36 and the ball passages 38 are provided on an identical horizontal plane, and they are located under the axial center of the ball screw shaft 16 (see FIG. 4).

As shown in FIG. 5, the end plates 32, which are attached to the both side surfaces of the main slider body 30, are formed with curved passages 40 which make communication between the ball passages 38 and the ball-rolling grooves 36 provided along the inner surfaces of the slider 30. In this arrangement, the lubricating agent in the lubricating member 42 is supplemented to the curved passages 40 via the ball screw shaft 16 and holes 50 provided for the end plate 32. The slider 14 is formed with endless circulating passages 52 (see FIG. 4) composed of the ball-rolling grooves 26, 36 and the ball passages 38 provided opposingly for the main slider body 30, and the curved passages 40 provided for the end plates 32. A large number of balls 54 are rollably installed to the endless circulating passages 52.

Figure 2:
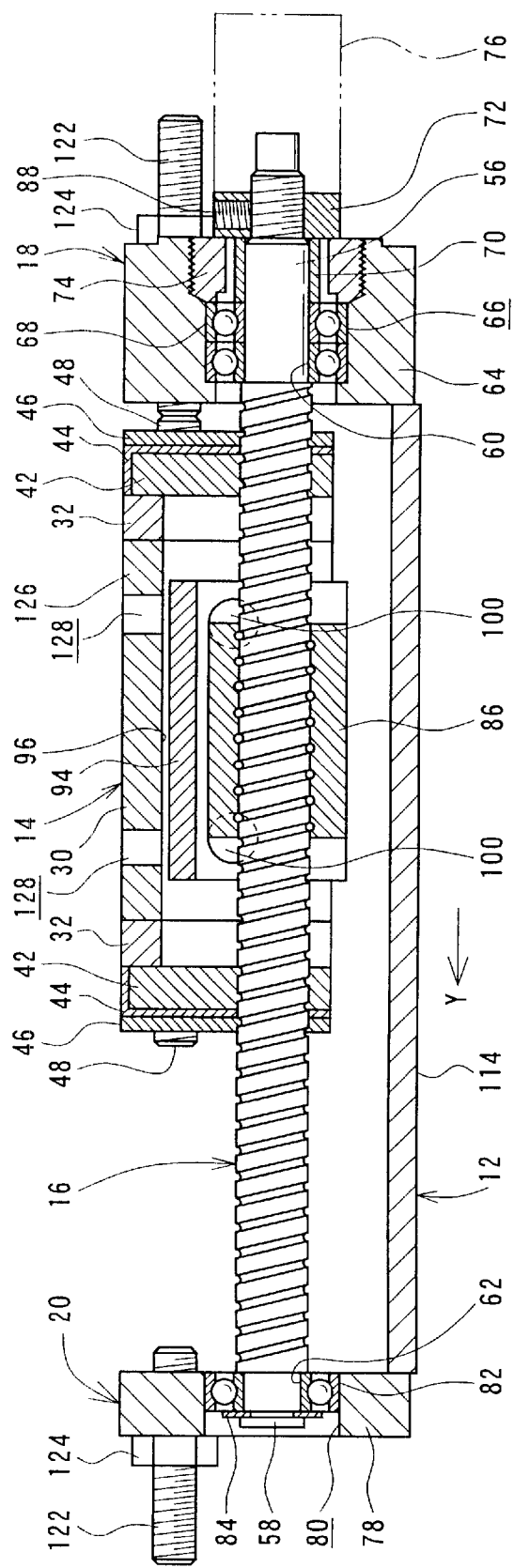
FIG. 2 shows a longitudinal sectional view in the major axis direction illustrating the arrangement of the linear actuator shown in FIG. 1.

As shown in FIG. 2, both ends 56, 58 of the ball screw shaft 16 are rotatably supported by the first bearing 18 and the second bearing 20 which are provided at journal sections 60, 62 of the both ends 56, 58.

The first bearing 18 comprises a first end plate 64 which is secured to the first end surface of the guide rail 12 by bolts (not shown), and a plurality of, for example, two first ball bearings 68 which are fitted to a bearing hole 66 bored through a central portion of the first end plate 64. The first end 56 of the ball screw shaft 16 is inserted into the bearing hole 66 by the aid of the first ball bearings 68.

In this arrangement, the first ball bearings 68 are secured to the first end plate 64 such that inner rings of the first ball bearings 68 are tightened by a screw mechanism composed of a spacer 70 which is fitted to the first end 56 of the ball screw shaft 16, and a bearing holder 72 which is disposed at the end 56. Outer rings of the first ball bearings 68 are tightened by a bearing nut 74 which is meshed with a screw mechanism provided for the first end plate 64. The first end 56 of the ball screw shaft 16 is connected to an unillustrated drive shaft of a motor 76. Reference numeral 88 indicates a set screw for preventing the bearing holder 72 from rotation.

The second bearing 20 comprises a second end plate 78 which is secured to the second end surface of the guide rail 12 by bolts (not shown), and a second ball bearing 82 which is fitted to a bearing hole 80 bored through a central portion of the second end plate 78. The second end 58 of the ball screw shaft 16 is inserted into the bearing hole 80 by the aid of the second ball bearing 82. In this embodiment, the second ball bearing 82 is secured as follows. That is, an inner ring of the second ball bearing 82 is fastened by a shaft-retaining ring 84 which is fitted to the second end 58 of the ball screw shaft 16. The second end 58 of the ball screw shaft 16 is rotatably supported by the second end plate 78 by the aid of the second ball bearing 82.

As shown in FIG. 4, a ball screw nut 86, which includes a well-known ball screw mechanism to be meshed with the ball screw shaft 16, has parallel surfaces 92 which are cut out substantially in parallel to one another. Reference numeral 94 indicates a screw guide member which is installed finely movably in a substantially horizontal direction to an inner upper surface 96 of the main slider body 30. The parallel surfaces 92 of the ball screw nut 86 are slidably fitted in a substantially vertical direction to opening surfaces 98 of the screw guide member 94 to guide the ball screw nut 86. Further, mobiles 100 are engaged in an aligned manner through the parallel surfaces 92 in a direction substantially perpendicular to the displacement direction of the main slider body 30 in the substantially horizontal plane. Bosses 102 of the mobiles 100 are slidably installed to holes 104 provided on outer surfaces disposed continuously to the sleeve sections 34, 34 of the main slider body 30.

In this arrangement, the ball screw nut 86 is finely movable in the vertical direction and in the horizontal direction so that any discrepancy is successfully absorbed even when the discrepancy occurs in a slight amount concerning the parallelism between the axis of the ball screw shaft 16 and the axis of the ball-rolling grooves 26, 36, owing to the floating mechanism which is supported finely movably by the screw guide member 94 in the substantially vertical direction and which is supported finely movably by the main slider body 30 by the aid of the mobiles 100 engaged with the screw guide member 94 in the substantially horizontal direction. The axial center of the mobiles 100 is located over the axial center of the ball screw shaft 16 in the horizontal direction.

As shown in FIGS. 1 and 4, two stripes of long grooves 108, 110, which are substantially parallel to one another in the axial direction, are formed on the switch rail 106 which is secured to the first end plate 64 and the second end plate 78 by the pair of bolts 105a, 105b. A sensor (not shown), which is positionally adjustable, is installed to the long groove 108, 110. The position of the main slider body 30 can be detected by sensing, with the sensor, the magnetic field of a magnet 112 which is attached to the main slider body 30 and which is displaceable integrally with the main slider body 30. Bolts (not shown) for attaching the linear actuator 10 are screwed into screw holes 116 (see FIG. 3) which are provided at a bottom surface 114 of the guide rail 12.

Figure 3:
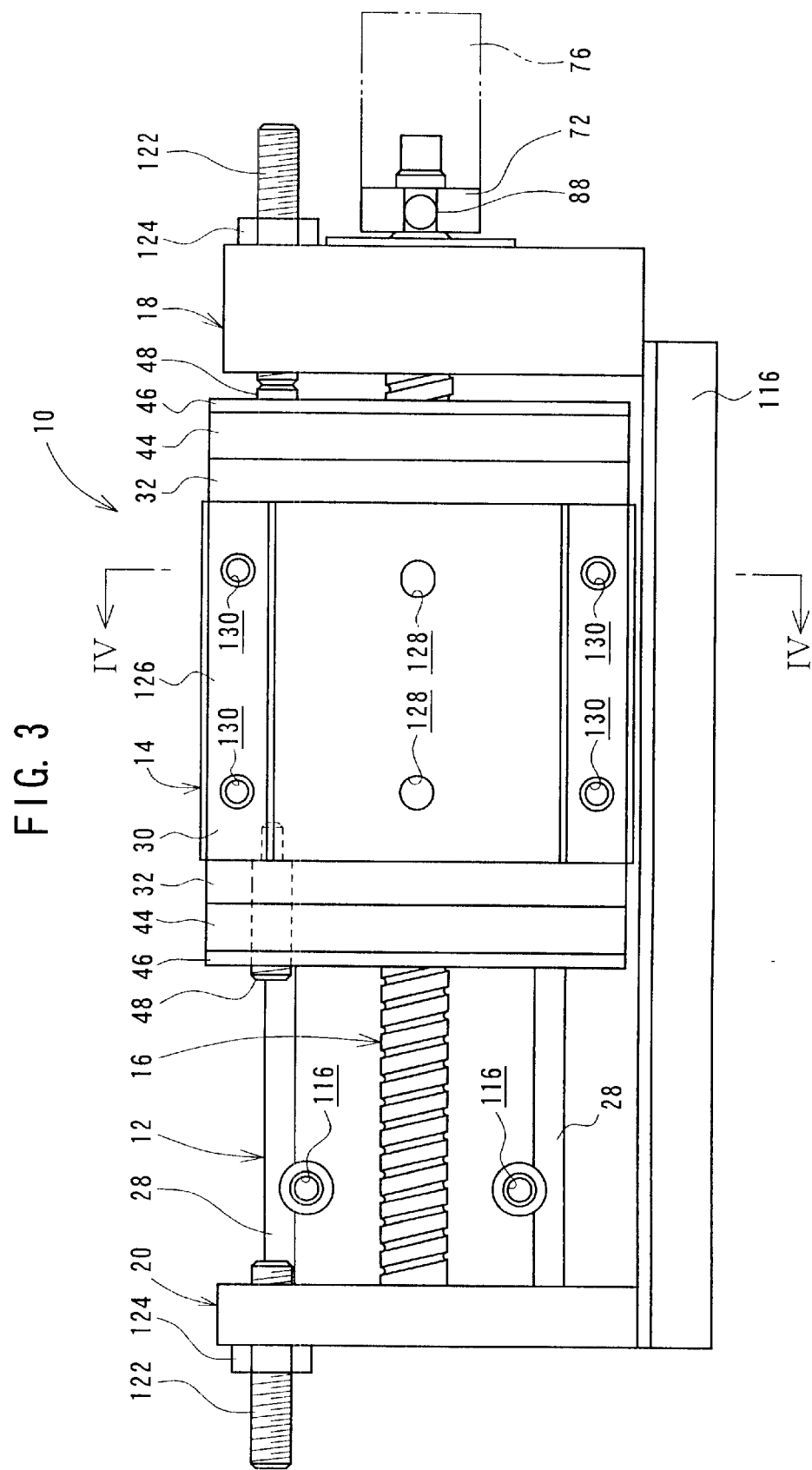
FIG. 3 shows a plan view illustrating the linear actuator shown in FIG. 1.

As shown in FIG. 4, the linear actuator 10 has legs 118 which are provided at the bottom surface 114 of the guide rail 12 while changing their attachment positions, and the legs 118 may be fixed with a tightening member 120 by the aid of unillustrated bolts as well. In FIGS. 1 to 3, reference numeral 122 indicates adjustment bolts for adjusting the stroke of the slider 14. The adjustment bolts 122 are screw-connected to the first end plate 64 and the second end plate 78 so that they are tightened to the both end plates 64, 78 by nuts 124.

Holes 128, which are bored at an upper surface 126 of the main slider body 30, are used to position an unillustrated table or the like, and threaded screw holes 130 are used to fix the table or the like.

The linear actuator 10 according to the first embodiment of the present invention is basically constructed as described above. Next, its operation, function, and effect will be explained.

As shown in FIGS. 2 and 3, when the ball screw shaft 16 is rotated in accordance with the driving action of the motor 76, then the ball screw nut 86 is driven in accordance with the engaging action thereof, and the slider 14 is moved in the axial direction (direction of the arrow Y) along the guide rail 12. The slider 14 is successfully moved smoothly in accordance with the rolling movement of steel balls (see FIG. 4) interposed between the ball screw shaft 16 and the ball screw hole of the ball screw nut 86 and the rolling movement of the balls 54 interposed between the ball-rolling grooves 26, 36 provided between the guide rail 12 and the slider 14.

In this case, as shown in FIG. 4, the ball screw nut 86 is held movably concerning the movement in the substantially vertical direction by the aid of the engagement between the parallel surfaces 92 of the ball screw nut 86 and the opening surfaces 98 of the screw guide member 94, and it is held movably concerning the movement in the substantially horizontal direction by the aid of the bosses 102 of the mobiles 100 supported slidably by the holes 104 of the main slider body 30. Therefore, the ball screw nut 86 is able to follow the operation form of the ball screw shaft 16 in response thereto.

Thus, the slider 14 is successfully moved smoothly along the guide rail 12 in accordance with the rotation of the ball screw shaft 16.

In this case, the slider 14 is not deformed, because it rides over the guide rail 12 in the bridging manner to support the load applied to the slider 14, by the both sleeve sections 34, 34 of the slider 14.

The widthwise dimension of the guide rail 12 is set to be smaller than the width of the slider 14 so that the upper surfaces 28, 28 of the guide rail 12 are internally provided in the recess 132 of the slider 14. Therefore, the volume of the guide rail 12 is decreased, and it is possible to realize a light weight of the guide rail 12.

Accordingly, in the embodiment of the present invention, it is unnecessary to maintain the complete parallelism for the axis of the ball-rolling grooves 26, 36 and the axis of the ball screw shaft 16 upon the assembling. Therefore, even when the axis of the ball-rolling grooves 26, 36 are not parallel to the axis of the ball screw shaft 16 to cause any slight discrepancy, it is possible to absorb the discrepancy by means of the floating mechanism. Accordingly, the assembling operation time is shortened, and it is possible to reduce the production cost.

In the embodiment of the present invention, the axial center of the mobile 100 in the horizontal direction is provided over the axial center of the ball screw shaft 16. However, en equivalent effect is obtained even when the axial center of the mobile 100 in the horizontal direction is provided under the axial center of the ball screw shaft 16.

The embodiment of the present invention has been explained as exemplified by the case in which the ball screw shaft 16 and the ball screw nut 86 are used. However, it is a matter of course that an unillustrated sliding contact screw may be used.

Figure 6:
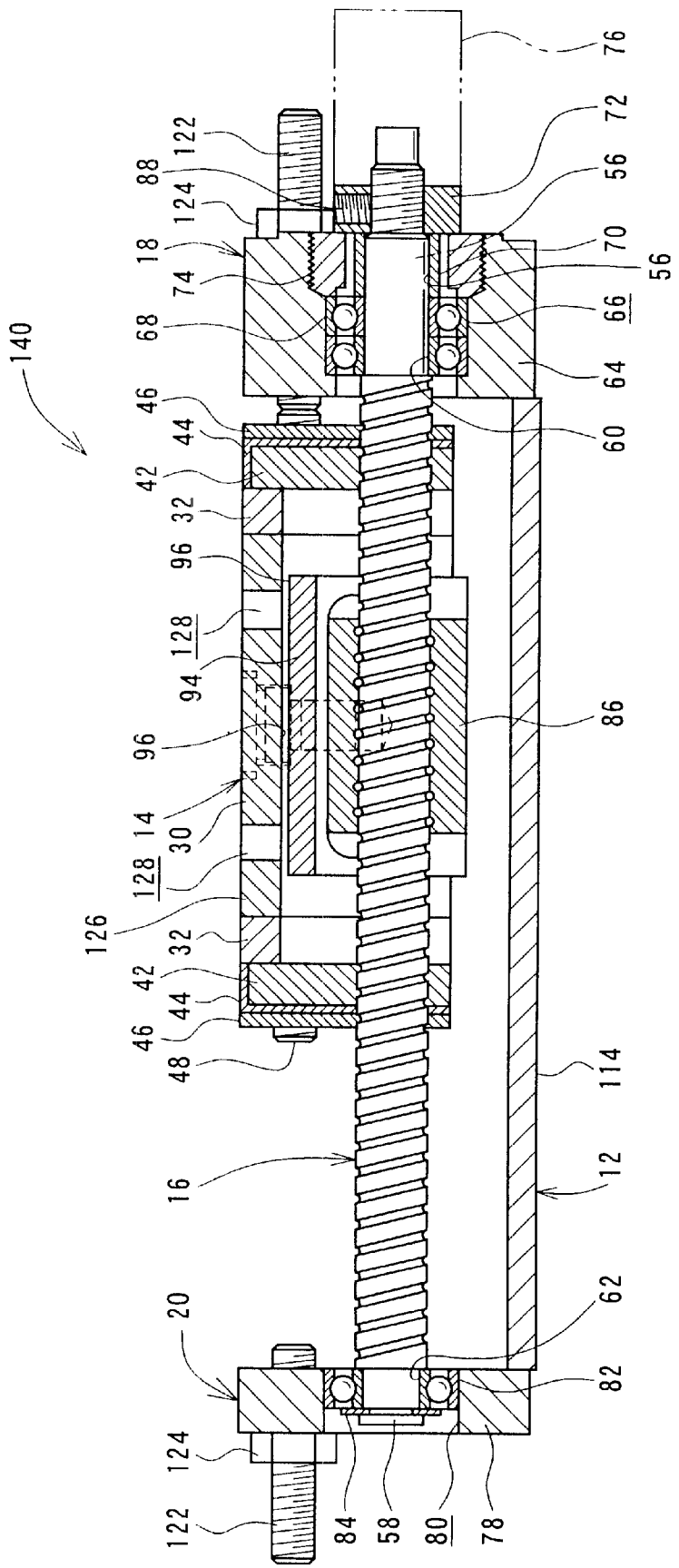
FIG. 6 shows a longitudinal sectional view in the major axis direction illustrating an arrangement of a linear actuator according to another embodiment of the present invention.
Figure 7:
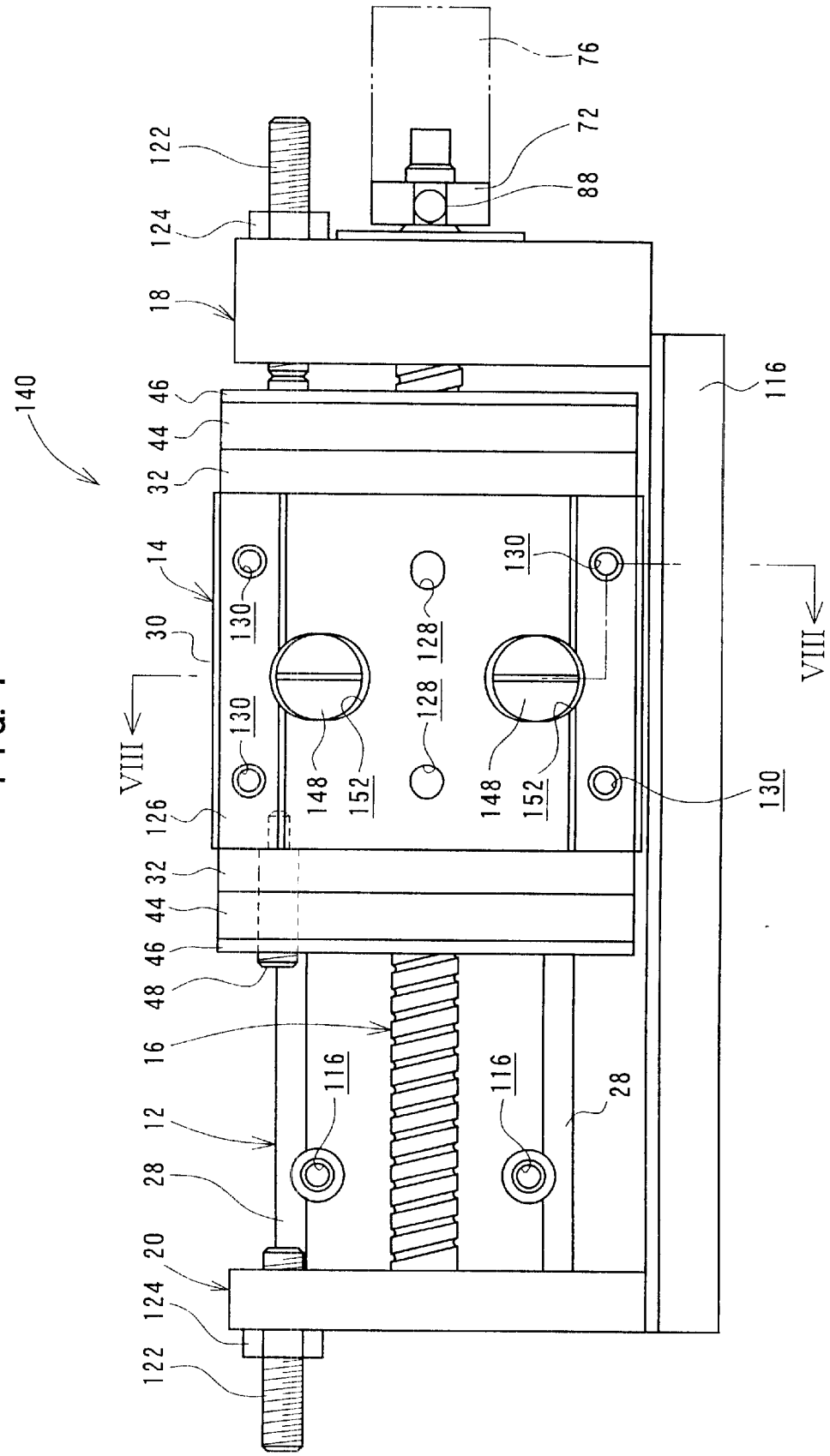
FIG. 7 shows a plan view illustrating the linear actuator shown in FIG. 6.
Figure 8:
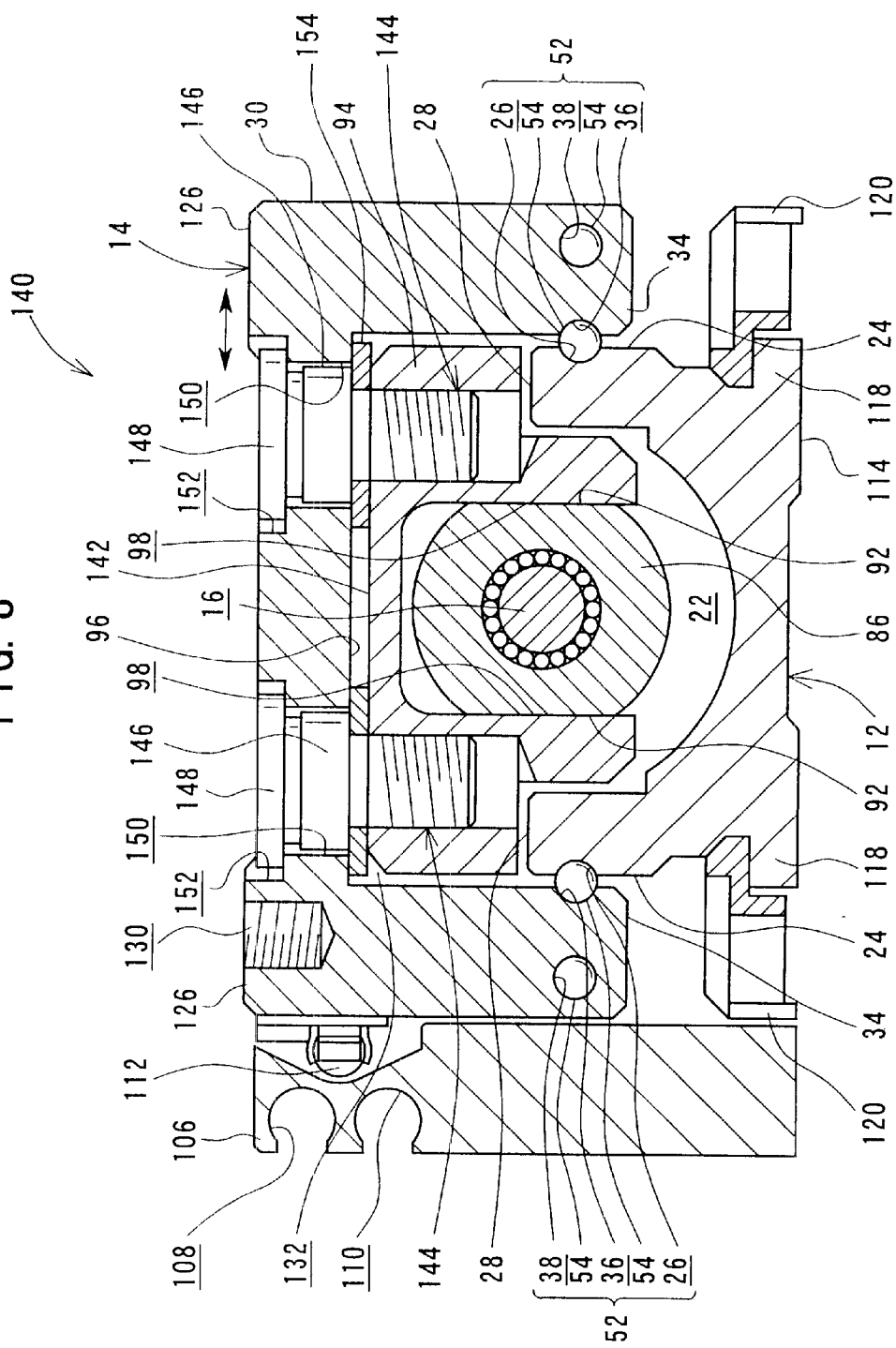
FIG. 8 shows a vertical sectional view taken along a line VIII—VIII shown in FIG. 7.

FIGS. 6 to 8 show an arrangement of a linear actuator 140 according to another embodiment of the present invention. In the following description, the same constitutive components as the constitutive components depicted in FIGS. 1 to 5 described above are designated by the same reference numerals, detailed explanation of which will be omitted.

As shown in FIG. 8, mobiles 144, which are aligned in identical planes in a substantially vertical direction at the outside of opening surfaces 98 of a screw guide member 94, are engaged with an upper surface 142 of the screw guide member 94. Bosses 146 and heads 148 of the mobiles 144 are installed to holes 150 and slotted holes 152 which are bored at an upper surface 126 of a main slider body 30 respectively. The mobiles 144 are supported by the screw guide member 94 so that parts of outer circumferential surfaces of the heads 148 are circumscribed by inner circumferential surfaces of the slotted holes 152 of the main slider body 30 to make it possible to cause fine movement in the directions of the arrows. Reference numeral 154 indicates washers which are interposed between the inner upper surface 96 of the main slider body 30 and the upper surface 142 of the screw guide member 94 to hold the bosses 146 of the mobiles 144 in a floating manner with respect to the main slider body 30.

In this arrangement, the mobiles 144 are provided in the substantially vertical direction for the screw guide member 94. Accordingly, the widthwise dimension of the slider 14 can be made to be relatively small.

What is claimed is:
1. A linear actuator comprising:
a guide rail provided with ball-rolling grooves extending in a major axis direction on both side surfaces and formed with a concave groove having a substantially U-shaped cross section;
a ball screw shaft arranged substantially in parallel to said ball-rolling grooves at a central portion in a widthwise direction substantially perpendicular to said major axis direction of said guide rail;
bearings for supporting said ball screw shaft at both ends in said major axis direction of said guide rail;
a slider formed with endless circulating passages including ball-rolling grooves opposed to said ball-rolling grooves of said guide rail so that said guide rail faces an interior of a recess;
a ball screw nut installed to a recess of said slider, for making engagement with said ball screw shaft; and
a screw guide member for movably supporting said ball screw nut, said linear actuator further comprising:
a floating mechanism for absorbing fine movement of said ball screw nut in a direction substantially perpendicular to a displacement direction on a substantially horizontal plane, and fine movement of said ball screw nut in a substantially vertical direction respectively.

2. The linear actuator according to claim 1, wherein said floating mechanism includes a mobile connected to said screw guide member for movably supporting said ball screw nut in said substantially vertical direction, and a hole for allowing said mobile to make engagement with said slider.

3. The linear actuator according to claim 2, wherein a pair of said mobiles are provided in a substantially horizontal direction substantially perpendicular to an axis of said ball screw shaft with said ball screw nut intervening therebetween.

4. The linear actuator according to claim 2, wherein a pair of said mobiles are provided in a substantially vertical direction substantially perpendicular to an axis of said ball screw shaft with said ball screw nut intervening therebetween.

5. The linear actuator according to claim 2, wherein said hole for making engagement with said slider is a slotted hole.

6. The linear actuator according to claim 1, wherein a lubricating member is installed to said slider by the aid of a cover member.

7. The linear actuator according to claim 1, wherein said screw guide member is formed with a pair of substantially parallel opening surfaces separated from each other by a predetermined spacing distance, and said ball screw nut is formed with a pair of substantially parallel surfaces for making sliding movement along said pair of opening surfaces.

* * * * *